United States Patent Office 3,460,901
Patented Aug. 12, 1969

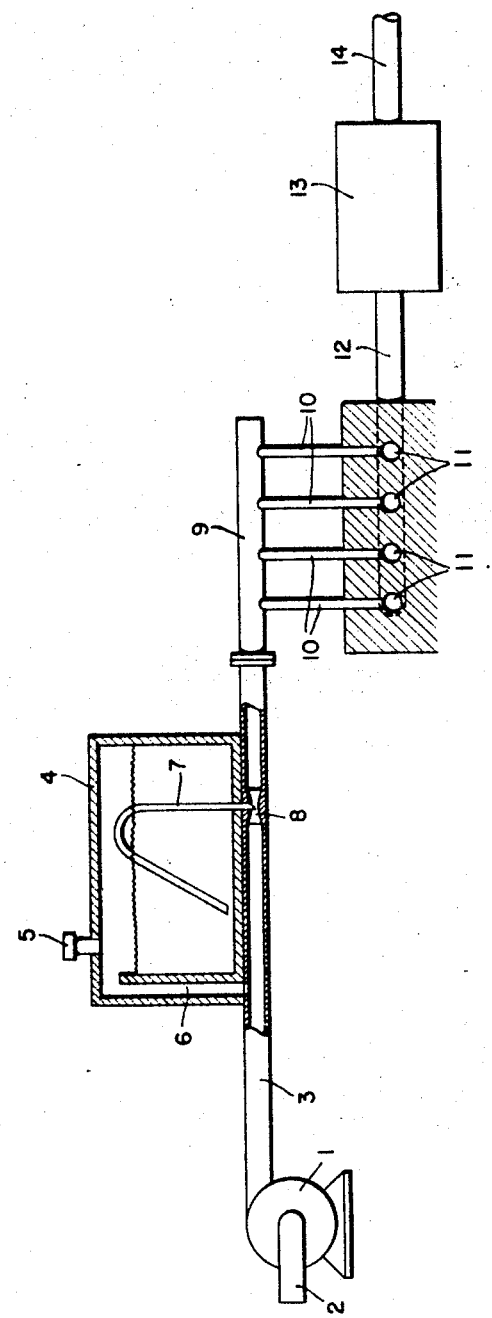

3,460,901
METHOD AND APPARATUS FOR TREATING AUTOMOTIVE EXHAUST GAS
Victor F. Massa, Berkeley Heights, and George P. Gross, Westfield, N.J., assignors to Esso Research and Engineering Company, a corporation of Delaware
Filed June 11, 1965, Ser. No. 463,157
Int. Cl. C01b 2/14
U.S. Cl. 23—2
2 Claims

ABSTRACT OF THE DISCLOSURE

Unburned hydrocarbons and carbon monoxide pollutants emitted from automotive exhaust gases can be reduced by dispersing into the exhaust gas stream air and a combustion oxidant-initiator compound of reactive fragments of peroxide ions, peroxide radicals, hydroxyl radicals or mixtures thereof to thereby oxidize such exhaust pollutants.

---

This invention provides a method and means for abatement of air pollution from automotive exhaust gas. It is concerned primarily with lowering the emission of unburned hydrocarbons and carbon monoxide pollutants by addition of an oxidation-initiating and promoting substance, particularly hydrogen peroxide, to improve the conversion of such pollutants to innocuous compounds, $CO_2$ and $H_2O$.

One technique currently being tried for reduction of air pollution by unburned hydrocarbons and carbon monoxide involves the injection of air into the exhaust ports of automotive engines to achieve the combustion of the unburned hydrocarbons and carbon monoxide in the exhaust gas leaving the engine cylinders. This technique employs an air pump driven by the engine fan belt to supply air into the exhaust port to obtain additional combustion. The additional combustion achieved by such a technique varies with temperature, time, and concentration of reacting species, and can be greatly improved by addition of an oxidation-initiating and promoting substance.

In accordance with the present invention, the addition of hydrogen peroxide, even in small proportions, to the exhaust gas has been demonstrated to be effective in promoting oxidation of the unburned hydrocarbons and carbon monoxide. For example, using a device in the form of a carburetor, a mixture of hydrogen peroxide (20 to 35%) and water (65 to 80%) has been aspirated in small amounts into the exhaust gas stream leaving the engine exhaust valve and entering into an afterburning zone to accomplish substantially greater oxidation of the mentioned pollutants with and without additional air as compared to the effectiveness of additional air alone.

An example of a device employed for aspirating and atomizing a hydrogen peroxide-water mixture into the exhaust gas for afterburning is shown schematically in the attached drawing.

The device shown in the drawing comprises a venturi and jet system, as in a carburetor, and which can be adjusted to vary the amount of the hydrogen peroxide-water mixture injected as desired and in response to engine demand, e.g., in response to the change in air flow or exhaust gas flow, or in response to temperature or other sensing device serving to indicate the need for addition of the oxidation-initiating agent.

In the drawing, the air pump 1 having an air inlet 2 supplies additional air for combustion through line 3. The carbureting device includes a container 4 to hold the hydrogen peroxide-water mixture which is supplied to the container 4 through the filling cap 5. A pressure equalizing passage 6 communicates from the container 4 above the level of the liquid mixture with the air stream 3. The liquid mixture of hydrogen peroxide-water is fed through the tube 7 into the air stream as it flows past the venturi constriction 8 to form a fog-like dispersion of the hydrogen-peroxide-water mixture in the air which serves as the carrier gas. The air with the dispersed oxidant mixture flows through the manifold tube 9 to be injected through connections 10 to one or more exhaust gas ports 11; from which ports, the mixed exhaust gas and air or carrier gas containing the dispersed oxidant flows by way of tube 12 into an afterburning zone in reactor vessel 13. Vessel 13 may comprise various forms including an undefined portion of a conventional exhaust manifold or pipe, an enlarged portion thereof of any convenient configuration, or a discrete vessel or chamber, and may, if desired, be insulated and/or equipped with internal baffles to improve mixing of the gases. The exhaust gas is discharged from vessel 13 through pipe 14.

The liquid hydrogen peroxide-water mixture need not be aspirated but can be injected in other ways suitable for dispersing the oxidant into the carrier gas or directly into the exhaust gas ports. The flow of the liquid oxidant need not be continuous and can be limited, for example, only to periods of engine operation when unburned hydrocarbon emission tends to be at a high level, e.g., during engine acceleration, deceleration, or idle. This control can be accomplished easily by a valve mechanism for controlling the feed of the oxidant into the air stream controlled in response to the engine vacuum in the intake manifold. The described devices, the types of oxidant materials and the quantities used are given as examples of how the present method is flexible in obtaining the desired results.

In the demonstration and reduction to practice of this invention, a single-cylinder test engine was used with means for recording and precisely controlling speed, flow rates, temperatures, and pressures and for analyzing the exhaust gas and products of afterburning combustion. The carrier gas into which the oxidizing additive was dispersed was either compressed air or recycled exhaust gas cooled and freed of water. The carrier gas was forced at about 3.5 liters/minute through an orifice installed inside a conventional tubing T positioned to deliver the dispersed mixture into the exhaust gas from the engine as it flowed from the engine into an afterburner reactor. The oxidant solution was introduced through a second orifice intersecting perpendicularly the axis of the first, or carrier-gas, orifice to obtain atomization. Gas pressure above the liquid oxidant in the supply reservoir was balanced with the upstream carrier-gas pressure, or controlled by adjustment of a separate supply regulator. The flow rate of the oxidant solution was controlled by the liquid level, by gas pressure, or by adjustment of a needle valve in the liquid-flow system.

In the experiments, a fuel consisting of 30 vol. percent toluene in isooctane was supplied to the engine operating at 1000 r.p.m., 15 inches Hg manifold vacuum and with 15° BTDC ignition timing. Under these conditions, the intake air rate was 0.318 lbs. of dry air/minute. Fuel rate was set so that the air supply provided about 91.5% of the air requirement for complete combustion, yielding an exhaust gas having a CO content of about 2% and an $H_2$ content of about 0.8%. Air for afterburning, when added through a line discharging into the exhaust gas just outside the engine exhaust valve, amounted to 10% of the intake air supply and provided a total overall air supply of 100.6% of the theoretical amount. Under this air-supply condition, the peroxide or oxidant solution was added to the carrier gas. In some experiments inert cooled exhaust gas was used as the carrier gas. In other experiments air was used as the carrier gas. These variations permitted a study of the action of the oxidant for effecting combustion of the unburned hydrocarbons and CO in the exhaust gas and for promoting the combustion of these pollutants. Samples were withdrawn for continuous analysis from the afterburner reaction zone or reactor at a plurality of points for determined residence times after adding air, inert carrier, and/or oxidant-initiator, allowing for residence times of about 0.2 to 0.8 seconds. The temperature of the afterburner reactor was maintained at fixed temperatures.

Experimental data showing major effects are presented in a summary form in the following table, which gives the percentage of hydrocarbon fully oxidized or eliminated by oxidation in the exhaust gas. Hydrocarbon analyses are by both hexane-sensitized nondispersive infrared (IR) and flame ionization (FIA).

components. During these periods the device can be operated to supply additional air and/or oxidant-initiator.

The experiments described serve as a guide to the use of any agency for injecting OH radicals, such as furnished by a dilute peroxide solution, to the exhaust gas for further combustion, while the water solvent present gives a cooled fog mixture with good distribution of the oxidant-initiator and avoids atomizer or injector-nozzle fouling.

The afterburning can be carried out as described in conjunction with the use of any other desired means for reducing or eliminating other pollutants, such as oxides of sulfur and oxides of nitrogen. The invention of an oxidant-initiator fluid for promoting afterburning can be used in conjunction with heterogeneous catalytic action utilizing an oxidizing catalyst. The system described can be used with both spark-ignition and compression-ignition TABLE I.—PROMOTION OF AIR-OXIDATION OF EXHAUST-GAS HYDROCARBONS BY HYDROGEN PEROXIDE ADDITION

| Reactor Air, lbs./min. | Carrier Gas, lbs./min. | 30% $H_2O_2$, cc./min. | Oxygen as percent of exhaust | | | Percent Reduction in Hydrocarbon | | | |
|---|---|---|---|---|---|---|---|---|---|
| | | | Total Available [1] | Found in Sampled Gas | | Upstream | | Outlet | |
| | | | | Upstream [2] | Outlet | IR | FIA | IR | FIA |
| None | Air: | | | | | | | | |
| | 0.0098 | 0 | 0.82 | 0.80 | 0.77 | 0 | 0 | 4 | 3 |
| | 0.0097 | 1 | 0.92 | 0.75 | 0.70 | 35 | 24 | 42 | 31 |
| | 0.0096 | 2.5 | 1.07 | *0.85 | 0.53 | *38 | *27 | 76 | 66 |
| None | Inert:[3] 0.0096 | 2 | 0.52 | *0.42 | 0.32 | *18 | *15 | 34 | 27 |
| 0.0317 | None | 0 | 2.28 | 2.12 | 1.95 | 26 | 20 | 58 | 42 |
| 0.0317 | Inert:[3] | | | | | | | | |
| | 0.0096 | 0 | 2.28 | 2.13 | 1.97 | 19 | 15 | 51 | 38 |
| | 0.0096 | 2 | 2.48 | 1.85 | 1.70 | 81 | 72 | 92 | 85 |

[1] Available oxygen is the sum of the oxygen (a) normally emitted by engine in exhaust gas, amounting to 0.2-0.3% (b) added near exhaust valve as reactor air, (c) added in carrier gas aspirating $H_2O_2$ solution, and (d) available by decomposition of $H_2O_2$ to $H_2O + \frac{1}{2}O_2$.

[2] Upstream sample represents residence time of about 0.2 second after carrier/peroxide addition, vs. 0.8 second for outlet sample.

[3] Inert carrier is cooled (to 1% water vapor content), filtered, compressed exhaust gas from sample analysis system.

*Interpolated average values.

It is evident that air alone without addition of the oxidant-initiator had a limited effect. This is particularly true where the sample analyzed was taken after a short residence time. Here air alone effected only 0 to 20% oxidation. With addition of the oxidant-initiator the oxidation level was greatly increased reaching 81% even when using inert gas, i.e., recycled exhaust gas, as the carrier for the oxidant-initiator. The effects observed with concurrent introduction of air and the peroxide oxidant-initiator were substantially greater than the sum of the effects obtained with air or the initiator alone. Specifically, when introducing air alone, without the peroxide oxidant-initiator, the amount of oxidation was only about 15 to 20%, and a similar result of 15 to 18% oxidation is seen with peroxide alone. Using both air and the peroxide oxidant-initiator increased the oxidation to about 72 to 81%.

The tabulated data do not show all of the duplicated results and do not show all of the observations made. It was observed in a number of experiments that there were temperatures at which air alone added to the exhaust gas showed no appreciable oxidizing effect whereas with the peroxide oxidant-initiator added the decrease of CO and hydrocarbon in the exhaust gas was substantial at corresponding temperatures.

Temperature measurements showed that the addition of the peroxide oxidant-initiator increased the evolution of heat to give the treated exhaust gas a higher temperature. This is an important factor during the initial or warm-up period of engine operation until the necessary temperature conditions are achieved and that is when the concentration of the unburned hydrocarbon and of CO tends to be highest in the exhaust gas. Similarly, during deceleration the exhaust gas tends to be cooler and richer in pollutant engines, both mobile and stationary. The means and method described may be used in treating an exhaust gas which contains residues from lead and halogen compounds introduced as antiknock additives in the fuel, as well as other pollutants mentioned.

The invention described is claimed as follows:

1. The method of promoting further combustion of engine exhaust gas which comprises dispersing into the exhaust gas air and a combustion oxidant-initiator compound of hydrogen peroxide which supplies therein reactive fragments of the group consisting of peroxide ions, peroxide radicals, hydroxyl radicals or mixtures thereof.

2. A method as described in claim 1 in which the combustion oxidant-initiator compound is an aqueous solution of hydrogen peroxide.

References Cited

UNITED STATES PATENTS

| 1,605,484 | 11/1926 | Thompson et al. | 23—2 |
| 1,867,325 | 7/1932 | Neville | 23—288 X |
| 2,038,313 | 4/1936 | Placko | 60—30 |
| 3,307,920 | 3/1967 | Barnes | 23—2 X |

OTHER REFERENCES

E. Hawthorne: Chem. Abstracts, vol. 41, p. 2226a (1947).

L. Karmilova et al.: Chem. Abstracts, vol. 56, p. 8050d (1962).

OSCAR R. VERTIZ, Primary Examiner

ARTHUR GREIF, Assistant Examiner

U.S. Cl. X.R.

23—288, 60—30